(12) United States Patent
Prirsch

(10) Patent No.: US 8,689,431 B2
(45) Date of Patent: Apr. 8, 2014

(54) APPARATUS FOR THE CONNECTION OF ARTICLES VIA AT LEAST ONE CONNECTION ELEMENT PLASTICIZABLE BY HEAT

(75) Inventor: Bernd Prirsch, Villingendorf (DE)

(73) Assignee: Maschinenfabrik Spaichingen GmbH, Spaichingen (DE)

( * ) Notice: Subject to any disclaimer, the term of this patent is extended or adjusted under 35 U.S.C. 154(b) by 677 days.

(21) Appl. No.: 12/799,728

(22) Filed: Apr. 29, 2010

(65) Prior Publication Data

US 2010/0281663 A1 Nov. 11, 2010

(30) Foreign Application Priority Data

May 6, 2009 (DE) .......................... 10 2009 020 180

(51) Int. Cl.
*H05B 3/00* (2006.01)
(52) U.S. Cl.
USPC ........... 29/611; 29/243.54; 29/613; 72/342.4; 72/342.5; 72/342.3
(58) Field of Classification Search
USPC ........... 29/243.5, 243.54, 611, 613; 72/342.4, 72/342.3, 342.92, 342.5
See application file for complete search history.

(56) References Cited

U.S. PATENT DOCUMENTS

| | | | | |
|---|---|---|---|---|
| 1,446,879 | A * | 2/1923 | Coffey | 148/644 |
| 4,139,833 | A * | 2/1979 | Kirsch | 338/308 |
| 4,425,692 | A * | 1/1984 | Minegishi et al. | 29/611 |
| 5,235,737 | A * | 8/1993 | Gellert | 29/611 |
| 5,471,865 | A * | 12/1995 | Michalewski et al. | 72/430 |
| 5,515,705 | A * | 5/1996 | Weldon et al. | 72/19.1 |
| 6,769,595 | B2 * | 8/2004 | Stol et al. | 228/112.1 |
| 7,003,996 | B2 * | 2/2006 | Dykstra et al. | 72/60 |
| 7,465,905 | B2 | 12/2008 | Braun | |

FOREIGN PATENT DOCUMENTS

| | | |
|---|---|---|
| DE | 10 2004 057 453 B3 | 11/2004 |
| DE | 10 2006 039 658 A1 | 3/2008 |
| EP | 1 712 342 A1 | 10/2006 |
| JP | 63-194 930 A | 8/1988 |
| JP | 11 291 349 A | 10/1999 |

* cited by examiner

*Primary Examiner* — Chi Q Nguyen
(74) *Attorney, Agent, or Firm* — Kilpatrick Townsend & Stockton LLP

(57) ABSTRACT

An apparatus for the connection of articles via at least one connection element plasticizable by heat includes a heatable cap, which is movable toward and away from the connection element and which has a shaft, for the forming of a rivet head at the connection element and having means for the direct heating of the cap. In this respect, the means for the direct heating of the cap include at least one ceramic heating element.

22 Claims, 3 Drawing Sheets

APPARATUS FOR THE CONNECTION OF ARTICLES VIA AT LEAST ONE CONNECTION ELEMENT PLASTICIZABLE BY HEAT

CROSS-REFERENCES TO RELATED APPLICATIONS

This application claims priority to German Application No. 10 2009 020 180.7, filed May 6, 2009, the disclosure of which is incorporated herein by reference.

BACKGROUND OF THE INVENTION

The invention relates to an apparatus for the connection of articles via at least one connection element plasticizable by heat, the apparatus having a heatable cap, which is movable toward and away from the connection element and which has a shaft, for the forming of a rivet head at the connection element and having means for the direct heating of the cap.

Apparatus of this kind work according to the so-called rivet peg welding principle according to which a projection, the so-called rivet peg, formed at a connection element attached to one of the articles is pushed through an opening of the other article and is then provided with a shaped rivet head at the free end of the rivet peg. The connection element in this respect can also be made from a separate component which is pushed through both articles and has an already attached head at one end.

The shaping of the rivet head takes place, when the described welding principle is used, in that the rivet peg is plasticized by heating and is brought into the shape desired in the individual case by means of a tool called a cap in the following and pressed against the rivet peg. In this respect, at least one of the two joining partners is usually made from a plasticizable plastic, although it is also sufficient in principle, however, if only the involved connection elements or the rivet pegs provided thereon are made from a plasticizable material.

An apparatus of the initially named kind is described in DE 10 2004 057 453 B3. In this respect, a rivet cap is coupled to a heat source and is heated. As soon as the cap has reached a temperature which is above the softening point of the material to be processed, it is lowered onto the tool and reshapes a rivet peg into a rivet head. Subsequently, the rivet cap is decoupled from the heat source and thereby cooled. The heat source includes an electric heating coil which is operated continuously. To cool the cap, the heat source including the electric heating coil is separated from the cap before the removal of the cap from the rivet head. The construction effort required for this is relatively large.

It is the underlying object of the invention to provide an improved apparatus of the initially named kind with which the previously mentioned disadvantages have been eliminated. In this respect, in particular a fast heating of the cap should also still be maintained with a minimized construction effort.

The object is satisfied in accordance with the invention in that the means for the direct heating of the cap include at least one ceramic heating element.

The invention thus inter alia exploits the circumstance that ceramic heating elements take up relatively little space and have a relatively fast heating rate. Furthermore, ceramic heating elements have a relatively low mass so that they can be cooled relatively quickly again.

In this respect, the ceramic heating element is preferably in direct contact with the cap body. It can, in particular, be fixedly connected to the cap.

In accordance with a preferred practical embodiment of the apparatus in accordance with the invention, the ceramic heating element is pressed toward the cap body.

It is in particular also of advantage if the ceramic heating element has an annular shape and is attached to the cap shaft in direct contact with the cap body.

BRIEF SUMMARY OF THE INVENTION

A preferred practical embodiment of the apparatus in accordance with the invention is characterized in that the ceramic heating element is clamped between the cap body and a cap carrier, with the shaft of the cap having an external thread and being screwed into an internal thread of the cap carrier. The ceramic heating element is in this respect therefore clamped between the cap body and the cap carrier by screwing the cap shaft into the internal thread of the cap carrier.

An extremely simple, compact arrangement thus results with which the cap can be heated back up to the temperature required for the welding process very quickly after a respective cooling.

The ceramic heating element can in particular be manufactured from a material which contains at least one of the following compounds: aluminum oxide ($Al_2O_3$), zirconium dioxide ($ZrO_2$), silicon nitride ($Si_3N_4$) and aluminum nitride (AlN).

Means for the detection and monitoring of the temperature are advantageously associated with the ceramic heating element. In this respect, these means in particular include at least one thermal sensor.

In accordance with a preferred embodiment, means are provided for the inner cooling of the cap by means of a cooling fluid.

Since the cap body is cooled from the inside, a relatively small cooling fluid consumption or a relatively short cooling time, a considerable noise minimization and a compact construction shape result.

It is in particular of advantage in this respect if the shaft of the cap has a central cooling fluid passage preferably reaching up to and into the cap body and if a plurality of respective at least generally radially outwardly directed cooling fluid passages starting from the central cooling fluid supply passage are provided within the cap body.

Alternatively, the cap can be manufactured at least partly from porous, air-permeable material, in particular ceramic material, and the shaft of the cap can be provided with a central cooling fluid supply bore preferably reaching up and into the cap body.

In this respect, at least the cap body is manufactured from such a porous, air-permeable material, in particular ceramic material. This preferably also applies to the cap shaft, however.

The cooling fluid supplied via the central cooling fluid supply bore thus flows outwardly via a plurality of small passages through the porous, air-permeable cap body and preferably also the cap shaft, whereby the cap is cooled uniformly and effectively.

The invention will be explained in more detail in the following with reference to embodiments and to the drawing; there are shown in this:

DETAILED DESCRIPTION OF THE INVENTION

Figure 1:
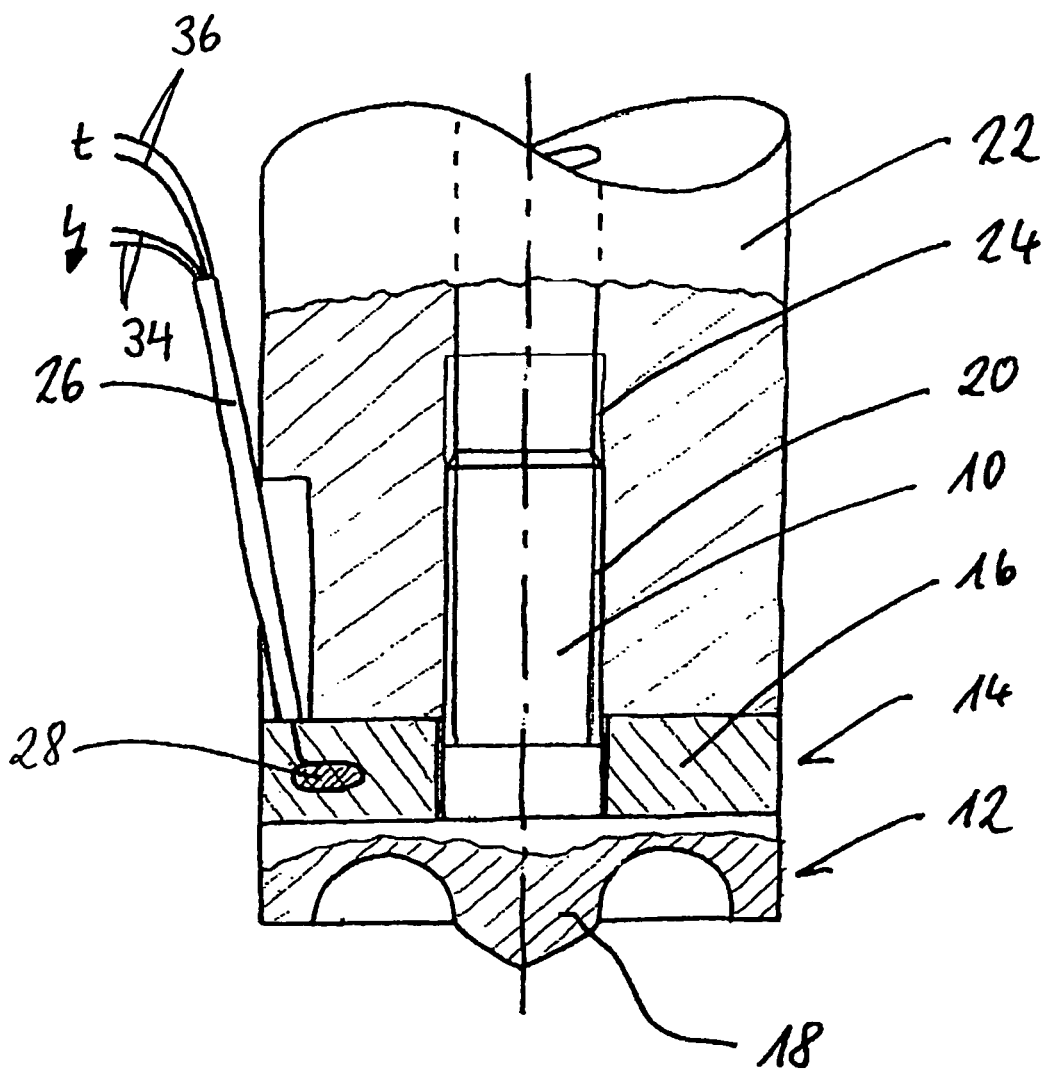
FIG. 1 is a simplified schematic part representation of an exemplary embodiment of the apparatus in accordance with the invention.

FIG. 1 shows in a simplified schematic part representation an exemplary embodiment of an apparatus for the connection of articles via at least one connection element plasticizable by heat, the apparatus having a cap 12, which is movable toward and away from the connection element and which has a shaft 10, for the forming of a rivet head at the connection element and having means 14 for the direct heating of the cap 12.

In this respect, the means 14 for the direct heating of the cap 12 include at least one ceramic heating element 16.

The ceramic heating element 16 is in direct contact with the cap body 18. In this respect, the ceramic heating element 16 can in particular be fixedly connected to the cap 12.

The ceramic heating element 16 is advantageously pressed toward the cap body 18.

The ceramic heating element 16 can in particular have an annular design and be attached to the cap shaft 10 in direct contact with the cap body 18.

In this respect, the ceramic heating element 16 is expediently clamped between the cap body 18 and a cap carrier 22, with the shaft 10 of the cap 12 having an external thread 20 and being clamped into an internal thread 24 of the cap carrier 22. The ceramic heating element 16 is in this respect therefore clamped between the cap body 18 and the cap carrier 22 by screwing the cap shaft 10 into the internal thread 24 of the cap carrier 22.

Means for the detection and/or monitoring of the temperature can in particular also be associated with the ceramic heating element 16, with them in particular being able to include at least one thermal sensor. In FIG. 1, such a thermal sensor 28 associated with the ceramic element 16 and an electric connector 26 can be recognized which includes lines 34 for the power supply of the thermal sensor 28 and lines 36 for the evaluation of the measured signals of the thermal sensor 28.

In the present case, only one single ceramic heating element 16 is associated with the cap 12.

It is generally also conceivable to provide at least two such ceramic heating elements for a respective cap 12.

Figure 2:
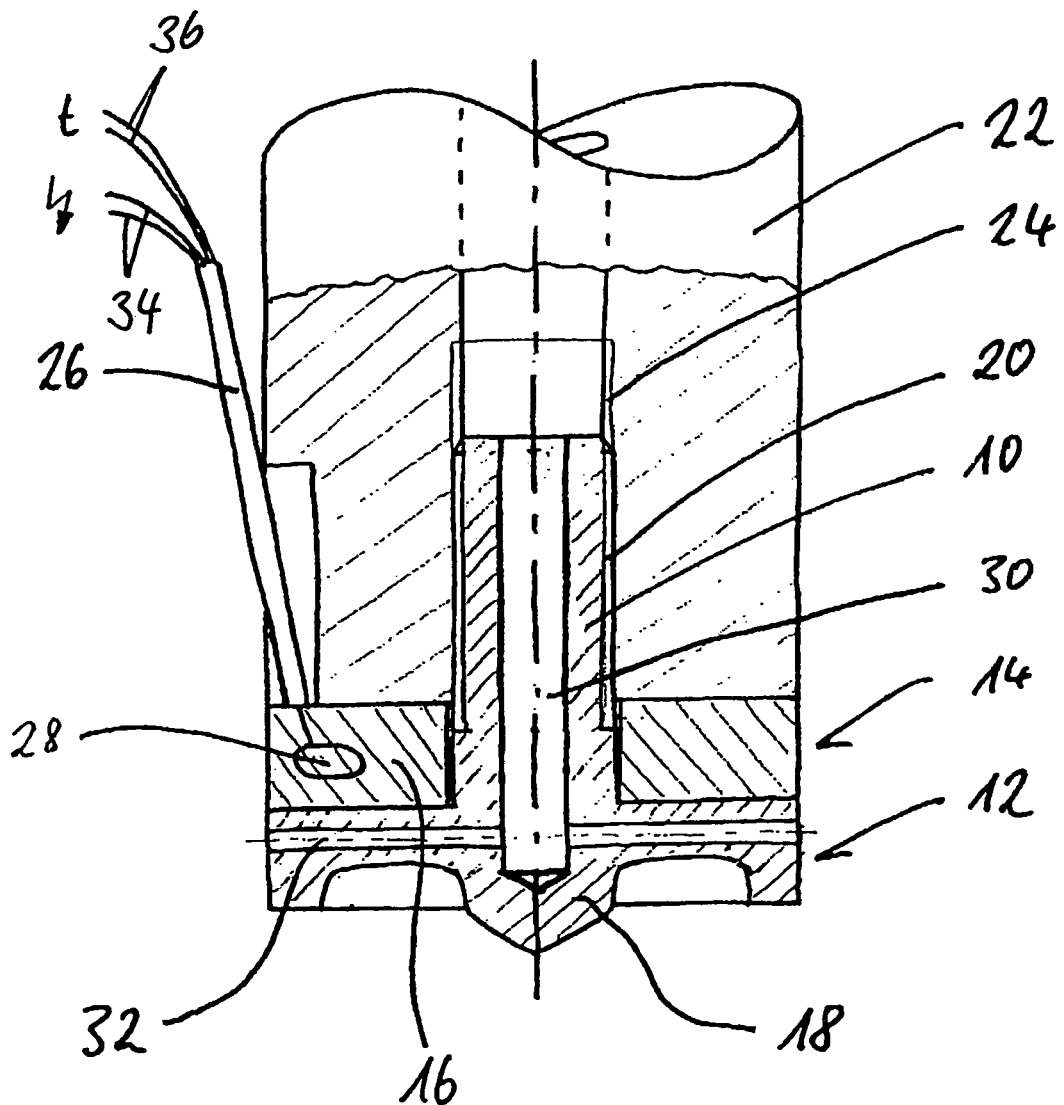
FIG. 2 is a simplified schematic part representation of a further exemplary embodiment of the apparatus in accordance with the invention, with means additionally being provided for the inner cooling of the cap.

FIG. 2 shows, in a simplified schematic part representation, a further exemplary embodiment of the apparatus which essentially only differs from the embodiment in accordance with FIG. 1 in that means 30, 32 are additionally provided for the inner cooling of the cap 12 by means of a cooling fluid.

In this respect, the cap 12 can in particular be provided with a central cooling fluid supply passage 30 as well as with a plurality of at least essentially radially outwardly extending cooling fluid passages 32 so that the cap 12 can be cooled from the inside out.

In another respect, this embodiment in accordance with FIG. 2 can at least essentially again have the same design as the embodiment in accordance with FIG. 1. Parts corresponding to one another have had the same reference numerals associated with them.

Figure 3:
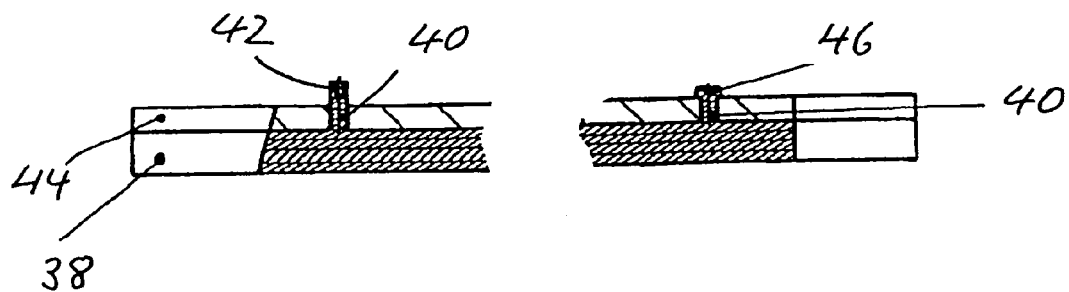
FIG. 3 is an exemplary representation of the so-called rivet peg welding principle according to which the apparatus in accordance with the invention can operate.

FIG. 3 shows an exemplary representation of the so-called rivet peg welding principle according to which the apparatus in accordance with the invention can operate. In accordance with this, a projection, the so-called rivet peg 42, formed at a connection element 40 attached to a first article 38 is first pushed through an opening of a second article 44 (cf. left hand side of FIG. 3) and the connection element 40 is then provided with a shaped rivet head 46 at the free end of the rivet peg 42 (cf. right hand side of FIG. 3). In this respect, the connection element can also comprise a separate component which is pushed through both articles and has an already applied head at one end.

The invention claimed is:

1. An apparatus for connecting articles via at least one connection element plasticizable by heat, the apparatus comprising:
    a heatable cap, which comprises a shaft;
    at least one ceramic heating element configured to directly heat the cap, wherein the ceramic heating element is generally annular, is attached to the shaft, and is in direct contact with a body of the cap; and
    a cap carrier, wherein the ceramic heating element is clamped between the body of the cap and the cap carrier, wherein the shaft comprises an external thread and is screwed into an internal thread of the cap carrier;
    wherein the apparatus is movable from a first position, remote from the connection element, to a second position, at which the cap is in contact with the connection element, wherein the apparatus is further configured such that, when the cap is in contact with the connection element and when the ceramic heating element heats the cap, the cap plasticizes the connection element and thereby forms a rivet head at the connection element.

2. The apparatus in accordance with claim 1, wherein the ceramic heating element is in direct contact with the body of the cap.

3. The apparatus in accordance with claim 2, wherein the ceramic heating element is fixedly connected to the cap.

4. The apparatus in accordance with claim 1, wherein the ceramic heating element is pressed toward the body of the cap.

5. The apparatus in accordance with claim 1, further comprising a temperature detector associated with the ceramic heating element.

6. The apparatus in accordance with claim 5, wherein the temperature detector comprises a thermal sensor.

7. The apparatus in accordance with claim 1, further comprising a cooling fluid passage configured to house a cooling fluid for cooling of the cap.

8. The apparatus in accordance with claim 1, further comprising a temperature monitor associated with the ceramic heating element.

9. The apparatus in accordance with claim 8, wherein the temperature monitor comprises a thermal sensor.

10. An apparatus for connecting articles via at least one connection element plasticizable by heat, the apparatus comprising:
    a heatable cap, which comprises a shaft;
    at least one ceramic heating element configured to directly heat the cap; and
    a cooling fluid passage configured to house a cooling fluid for cooling of the cap;
    wherein the apparatus is movable from a first position, remote from the connection element, to a second position, at which the cap is in contact with the connection element, wherein the apparatus is further configured such that, when the cap is in contact with the connection element and when the ceramic heating element heats the cap, the cap plasticizes the connection element and thereby forms a rivet head at the connection element;

wherein the cooling fluid passage comprises a central cooling fluid supply passage disposed in the shaft and a plurality of at least generally radially outwardly directed additional cooling fluid passages connected to the central cooling fluid supply passage and disposed within a body of the cap.

11. The apparatus in accordance with claim 10, wherein central cooling fluid supply passage reaches up to and into the cap body.

12. The apparatus in accordance with claim 10, wherein the ceramic heating element is in direct contact with the body of the cap.

13. The apparatus in accordance with claim 12, wherein the ceramic heating element is fixedly connected to the cap.

14. The apparatus in accordance with claim 10, wherein the ceramic heating element is pressed toward the body of the cap.

15. The apparatus in accordance with claim 10, wherein the ceramic heating element is generally annular, is attached to the shaft, and is in direct contact with the body of the cap.

16. An apparatus for connecting articles via at least one connection element plasticizable by heat, the apparatus comprising:
   a heatable cap, which comprises a shaft, wherein the cap further comprises porous, air-permeable material;
   at least one ceramic heating element configured to directly heat the cap; and
   a cooling fluid passage configured to house a cooling fluid for cooling of the cap;
   wherein the cooling fluid passage comprises a central cooling fluid bore;
   wherein the apparatus is movable from a first position, remote from the connection element, to a second position, at which the cap is in contact with the connection element, wherein the apparatus is further configured such that, when the cap is in contact with the connection element and when the ceramic heating element heats the cap, the cap plasticizes the connection element and thereby forms a rivet head at the connection element.

17. The apparatus in accordance with claim 16, wherein the cap comprises ceramic material.

18. The apparatus in accordance with claim 16, wherein the central cooling fluid bore reaches up to and into a body of the cap.

19. The apparatus in accordance with claim 16, wherein the ceramic heating element is in direct contact with a body of the cap.

20. The apparatus in accordance with claim 19, wherein the ceramic heating element is fixedly connected to the cap.

21. The apparatus in accordance with claim 16, wherein the ceramic heating element is pressed toward a body of the cap.

22. The apparatus in accordance with claim 16, wherein the ceramic heating element is generally annular, is attached to the shaft, and is in direct contact with a body of the cap.

* * * * *